(12) United States Patent
Grall

(10) Patent No.: US 12,459,605 B2
(45) Date of Patent: Nov. 4, 2025

(54) SYSTEM AND METHOD FOR DEPLOYING AND RECOVERING AN AUTONOMOUS UNDERWATER CRAFT BY A RECOVERY VEHICLE TOWED BY A SHIP, UNDERWATER EXPLORATION ASSEMBLY

(71) Applicant: IXBLUE, Saint-Germain-en-Laye (FR)

(72) Inventor: Sébastien Grall, Saint-Germain-en-Laye (FR)

(73) Assignee: IXBLUE, Saint-Germain-en-Laye (FR)

( * ) Notice: Subject to any disclaimer, the term of this patent is extended or adjusted under 35 U.S.C. 154(b) by 658 days.

(21) Appl. No.: 17/767,821

(22) PCT Filed: Oct. 8, 2020

(86) PCT No.: PCT/EP2020/078336
§ 371 (c)(1),
(2) Date: Apr. 8, 2022

(87) PCT Pub. No.: WO2021/069624
PCT Pub. Date: Apr. 15, 2021

(65) Prior Publication Data
US 2024/0083553 A1 Mar. 14, 2024

(30) Foreign Application Priority Data
Oct. 10, 2019 (FR) ..................... 1911281

(51) Int. Cl.
*B63B 21/66* (2006.01)
*B63B 27/14* (2006.01)
(Continued)

(52) U.S. Cl.
CPC ............ *B63B 21/66* (2013.01); *B63B 27/143* (2013.01); *B63G 8/001* (2013.01); *B63G 8/42* (2013.01); *B63G 2008/004* (2013.01)

(58) Field of Classification Search
CPC . B63B 21/66; B63B 27/143; B63B 2027/165; B63B 27/36; B63G 8/001; B63G 8/42; B63G 2008/004; B66D 1/52
See application file for complete search history.

(56) References Cited

U.S. PATENT DOCUMENTS 6,779,475 B1 * 8/2004 Crane .................... B63B 27/10
114/259
7,581,507 B2 * 9/2009 Kern .................... B65G 17/064
114/259

(Continued)

FOREIGN PATENT DOCUMENTS

| EP | 2 468 620 | 6/2012 |
| FR | 2 968 268 | 6/2012 |
| WO | 2014/135522 | 9/2014 |

OTHER PUBLICATIONS

International Search Report for PCT/EP2020/078336 dated Dec. 17, 2020, 6 pages.
(Continued)

*Primary Examiner* — Anthony D Wiest
(74) *Attorney, Agent, or Firm* — NIXON & VANDERHYE

(57) ABSTRACT

Disclosed is a system and a method for deploying and recovering an autonomous underwater craft by a ship-towed recovery vehicle. The craft is stored in the recovery vehicle's housing. The deployment is carried out in a first stage submerging the recovery vehicle with the craft stored therein, and a second stage releasing the craft. The ship includes a tilting launch ramp where the recovery vehicle is stored. The launch ramp takes at least a raised position with the recovery vehicle out of the water and an inclined position with the launch ramp rear end immersed. A translational device enables, in the launch ramp inclined position, the recovery vehicle to move along the launch ramp to be (Continued)

submerged and move from the ship while in tow during deployment and to be raised along the launch ramp during recovery. The system and the craft form an underwater exploration assembly.

13 Claims, 12 Drawing Sheets

(51) Int. Cl.
*B63G 8/00* (2006.01)
*B63G 8/42* (2006.01)

(56) References Cited

U.S. PATENT DOCUMENTS

| | | | |
|---|---|---|---|
| 8,430,049 B1 | 4/2013 | Tureaud et al. | |
| 8,967,067 B2 * | 3/2015 | Soreau | B63B 21/10 |
| | | | 114/259 |
| 2012/0160143 A1 | 6/2012 | Bailey | |

OTHER PUBLICATIONS

Written Opinion of the ISA for PCT/EP2020/078336 dated Dec. 17, 2020, 7 pages.

\* cited by examiner

SYSTEM AND METHOD FOR DEPLOYING AND RECOVERING AN AUTONOMOUS UNDERWATER CRAFT BY A RECOVERY VEHICLE TOWED BY A SHIP, UNDERWATER EXPLORATION ASSEMBLY

This application is the U.S. national phase of International Application No. PCT/EP2020/078336 filed Oct. 18, 2020 which designated the U.S. and claims priority to FR Patent Application No. 1911281 filed Oct. 10, 2019, the entire contents of each of which are hereby incorporated by reference.

TECHNICAL FIELD

The present invention generally relates to the field of underwater exploration and, more particularly, to a system and method for deploying and recovering an autonomous underwater craft by a recovery vehicle towed by a surface ship. It has applications in particular in the field of shipbuilding.

TECHNOLOGICAL BACKGROUND

Thanks to technical progress, in particular in electronics and computer science, it becomes possible to automate many operations such as underwater exploration. In addition to avoiding the personnel to be exposed to potentially dangerous environments, such as seas, both at the surface and in deep water, exploration operation durations can also be increased without being limited by physiological or legal constraints. For example, for sonar mapping, an autonomous underwater exploration craft having sonar and recorder devices can be assigned with a task of scanning a given geographic area by moving therein, without an operator having to continuously control the movements of the underwater craft.

It is also possible to automate the underwater craft recovery into docking stations, in deep water or at the surface.

Nevertheless, it remains necessary to be able to deploy and recover the underwater craft from the surface, on a ship, if only so that personnel can access it for maintenance or to move it quickly from one geographic area to another. A difficulty encountered is that the surface of the sea is not stable because of swell, winds . . . and that both deployment and recovery can lead to collisions between the ship and the underwater craft, not to mention the risks for the personnel in case these operations are not automated.

Various systems have been proposed for deploying and recovering an underwater craft from a ship, and in particular: WO 2014/135522 A1, U.S. Pat. No. 8,430,049 B1, FR 2 968 268 A1, EP 2 468 620 A1 and US 2012/160143 A1. Some of these systems use launch ramps but no wave impact damping means is provided, in particular in WO 2014/135522 A1, if a damping is provided, it is only between the underwater craft and guiding means. The present invention proposes a solution for teleoperating and even automating all the operations of an underwater craft from its deployment to its recovery, from a surface ship, the latter being preferably an unmanned surface drone.

DISCLOSURE OF THE INVENTION

It is first proposed according to the invention a system for deploying and recovering an autonomous underwater craft by a recovery vehicle towed by a surface ship, the system including the ship and the recovery vehicle, the towing being ensured by a towing cable connecting the recovery vehicle to the ship, the system being configured so that when not in use the underwater craft is stored in a housing of the recovery vehicle and the recovery vehicle is stored out of water in the ship, the recovery vehicle having, along its length, two opposite ends, including an end for receiving the autonomous underwater craft, providing access to the housing, the system being configured to allow the deployment to be performed in two stages, a first stage of submersing the recovery vehicle with the underwater craft stored in said recovery vehicle, a second stage of releasing the underwater craft by bringing the latter out of the housing of the submersed recovery vehicle once the towed recovery vehicle at a determined distance away from the ship, the system being configured to allow the recovery to be made in two phases, a first phase of entry of the underwater craft, through the receiving end, into the housing of the submersed towed recovery vehicle, a second phase of loading the towed recovery vehicle on board the ship, with the underwater craft stored in said recovery vehicle.

According to the invention, the ship comprises a launch ramp, which is tilting, and the system is configured to store the recovery vehicle on the launch ramp, the launch ramp having a longitudinal extent and two longitudinal ends, a front end on the ship bow side and a rear end on the ship stern side, said tilting launch ramp being able to take at least two positions: a raised position in which the stored recovery vehicle is out of water, said raised launch ramp being above the waterline of the ship, and an inclined position in which the rear end of the launch ramp is immersed, the system including a translational device enabling the recovery vehicle, in the inclined position of the launch ramp, to move along the launch ramp to be submersed and be able to move away from the ship while being towed by the latter during the deployment and to be raised along the launch ramp during the recovery, and the rear end of the launch ramp comprising buoyancy means allowing said launch ramp in the inclined position to beat as a function of the water height at the buoyancy means.

Other non-limiting and advantageous features of the system according to the invention, taken individually or according to all the technically possible combinations, are the following:
- the launch ramp in inclined position is free to beat as a function of the water height at the buoyancy means,
- the beat of the launch ramp in inclined position is limited, in particular by a passive or active damping system,
- the buoyancy means are inflatable tubes,
- the buoyancy means are a floating structure arranged in the ramp or forming at least part of the ramp,
- the ramp includes two rising lateral walls of triangular shape pointing forward (for example, like a sugar packaging box spout),
- the system is configured to store the recovery vehicle on the launch ramp outside the periods of deployment, recovery and use of the autonomous underwater craft,
- during the use of the autonomous underwater craft, the latter is free to navigate and is outside the recovery vehicle,
- the ship is drone,
- the ship is teleoperated,
- the ship can navigate unmanned,
- the system is moreover configured so that, in inclined position of the launch ramp, the recovery vehicle stored on the launch ramp has its receiving end submerged,
- the ship is a catamaran whose shell has two parallel lateral hulls, separated by an intermediate link area located above the waterline, and the system is further configured so that, in the raised position, the launch ramp is out of water and forms part of the intermediate link area, the intermediate link area is a wet area, the intermediate link area is watertight when the launch ramp is in raised position, sealing devices being arranged between the perimeter of the launch ramp and the edge of the intermediate link area opposite said perimeter of the launch ramp, the rear end of the launch ramp forms the rear end of the intermediate link area, the rear end of the launch ramp is remote the rear end of the intermediate link area, the ship is substantially symmetrical on either side of a sagittal, antero-posterior plane of the ship, whether the launch ramp is inclined or raised, the launch ramp is in a plane perpendicular to the sagittal plane of the ship, at least in the raised position, the hulls are of the tapered wave-piercing bow type, the ship includes a towing line winder/unwinder, the towing cable passes above the launch ramp during the deployment or the recovery, the launch ramp comprises a towing cable guiding device enabling said towing cable to be maintained free to slide along the launch ramp, during the use of the autonomous underwater craft, the system is configured in such a way that the recovery vehicle is towed while being submerged, during the use of the autonomous underwater craft, the system is configured in such a way that the recovery vehicle is stored out of water, without said autonomous underwater craft, inside the ship, the recovery vehicle has, along its length, a front end opposite to the receiving end, the towing cable is connected to the recovery vehicle toward the front end of said recovery vehicle, the towing cable is fastened to the recovery vehicle, the front end of the recovery vehicle is closed, the receiving end of the recovery vehicle is located at the rear of the latter and is open to provide access to the housing for the autonomous underwater craft, the front and rear ends of the recovery vehicle are defined with respect to the towing direction, the recovery vehicle has a generally elongated shape, the recovery vehicle comprises passive positioning means of the steerable aileron and/or rudder type, the recovery vehicle comprises active positioning means of the operable, and preferably steerable, propeller and/or turbine type, the housing of the recovery vehicle is closed on all its faces, except on the receiving end side, some of the faces of the recovery vehicle housing are openwork, the autonomous underwater craft has a generally elongated shape, the autonomous underwater craft has a torpedo shape, the autonomous underwater craft comprises at least one thruster and positioning means, said positioning means being steerable ailerons and/or rudders and/or being said at least one steerable thruster, the thruster of the autonomous underwater craft is of the propeller or turbine type, the autonomous underwater craft comprises a rear thruster, the rear thruster of the autonomous underwater craft protrudes from the rear of the recovery vehicle when the autonomous underwater craft is stored in the housing of the recovery vehicle, the rear of the autonomous underwater craft does not protrude from the rear of the recovery vehicle when the autonomous underwater craft is stored in the housing of the recovery vehicle, the system is configured to allow the recovery of the underwater craft into the recovery vehicle whereas the recovery vehicle is at a standstill, the ship being at a standstill, the system is configured to allow the recovery of the underwater craft into the recovery vehicle whereas the recovery vehicle is towed at a speed of at least one knot, the system is configured to allow the recovery of the underwater craft into the recovery vehicle whereas the recovery vehicle is towed at a speed between one knot and four knots, the system is configured to allow the recovery, into the ship, of the underwater craft stored in the recovery vehicle whereas the ship is at a standstill, the system is configured to allow the recovery, into the ship, of the underwater craft stored in the recovery vehicle whereas the ship sails at a speed of at least one knot, the system is configured to allow the recovery, into the ship, of the underwater craft stored in the recovery vehicle whereas the ship sails at a speed between one knot and eight knots, the determined distance starts from the moment when the recovery vehicle is completely out of/outside the launch ramp, the determined distance starts from the moment when the recovery vehicle is no longer plumb with the ship, the determined distance is defined by at least one depth and the system is configured in such a way that the underwater craft is released when a determined depth has been reached, said depth being of at least forty meters, the front end of the launch ramp comprises a swivel joint whose axis of rotation is perpendicular to the sagittal plane of the ship, the launch ramp being perpendicular to the sagittal plane of the ship in raised and in inclined position, the front end of the launch ramp comprises a swivel joint whose axis of rotation is perpendicular to the sagittal plane of the ship and thus perpendicular to the longitudinal extent of the launch ramp and thus in the width direction of the launch ramp, the launch ramp comprises at least one beat damper intended to damp the beats, the translational device comprises rolls and/or rollers and/or bearings and/or slides and/or sliding bands arranged on the launch ramp and intended to facilitate the lowering and the raising of the recovery vehicle along the ramp, at least one part of the recovery vehicle lowering along the launch ramp is passive, the force of gravity acting on the recovery vehicle located on the inclined launch ramp causing the lowering thereof, the system comprises an active assistance device for the lowering of the recovery vehicle located on the inclined launch ramp, the raising of the recovery vehicle on the inclined launch ramp is ensured by the towing cable, the launch ramp comprises controlled cylinders and/or chains and/or cables for the positioning in raised or inclined position according to the command, the launch ramp comprises a raised position locking device, the lower face of the launch ramp has a relief capable of damping the shocks caused by the waves, in particular a "breakwater" shape.

The invention also relates to an underwater exploration unit including the system of the invention as well as an autonomous underwater craft.

The invention finally relates to a method for implementing the unit according to the invention, in which, with a ship storing on a tilting launch ramp an autonomous underwater craft stored in a housing of a recovery vehicle, during a deployment of the autonomous underwater craft, the launch ramp is tilted in order to be brought to an inclined position in which the rear end of the launch ramp is immersed, the recovery vehicle that is towed by the ship thanks to a towing cable is immersed, the towing cable is unwound in such a way that the recovery vehicle storing the autonomous underwater craft goes away from the ship, then at a determined distance from the ship, the autonomous underwater craft is released out of the recovery vehicle.

DETAILED DESCRIPTION OF AN EXEMPLARY EMBODIMENT

Figure 1:
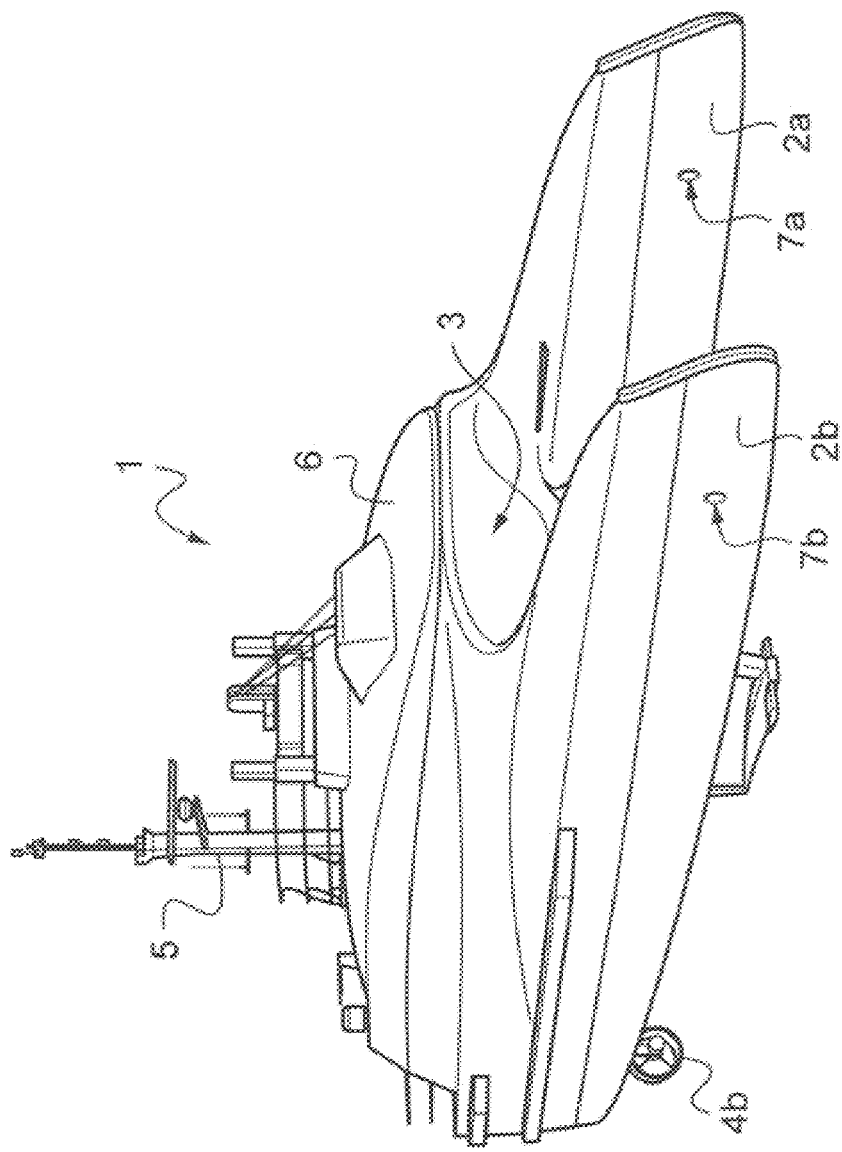
FIG. 1 shows a perspective view from the front, bow, of a ship according to the invention, storing in its sides an autonomous underwater craft stored in a recovery vehicle.
Figure 2:
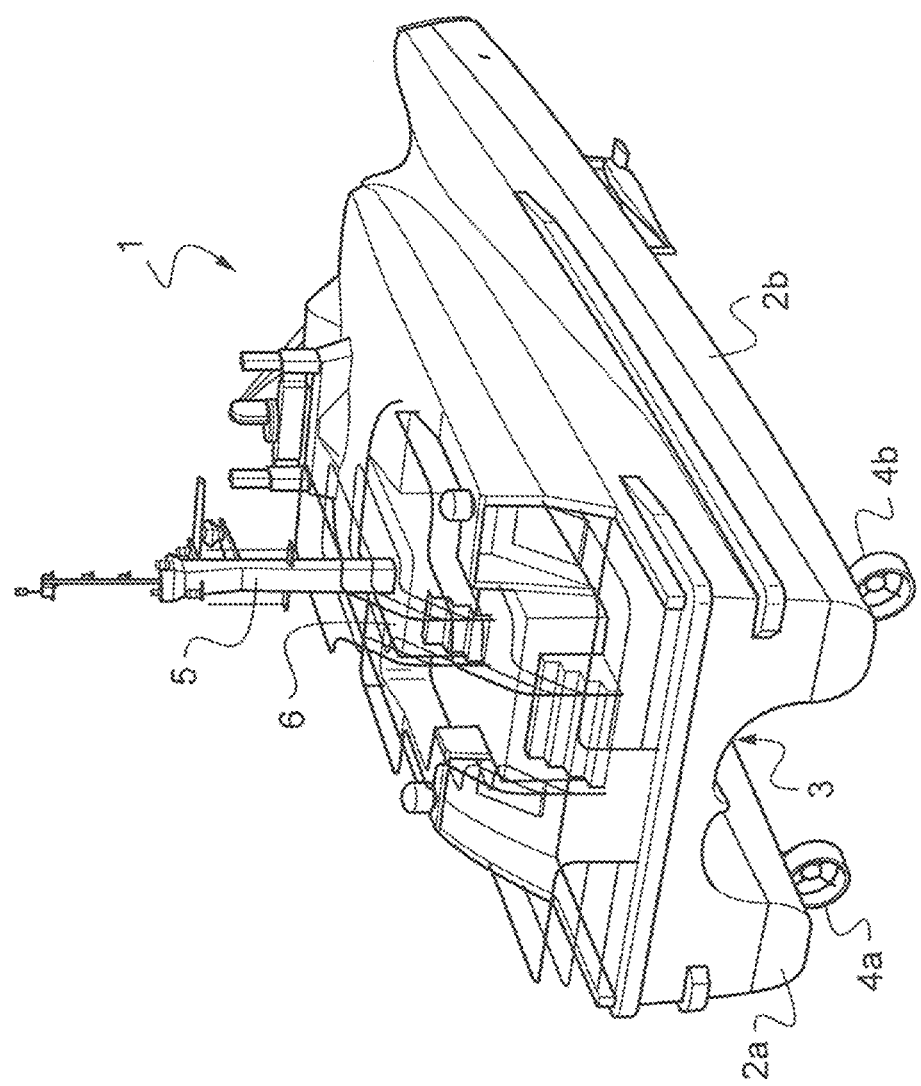
FIG. 2 shows a perspective view from the rear, stern, of the ship of FIG. 1.

The following description in relation with the appended drawings, given by way of non-limiting examples, will allow a good understanding of what the invention consists of and of how it can be implemented.

In its generality, the present invention relates to the field of underwater navigation and exploration. It thus proposes a solution for automatic deployment and recovery of an autonomous underwater craft (or "autonomous underwater vehicle" AUV) 12. The platform on which is recovered the autonomous underwater craft 12 can be of various types, in particular an autonomous ship 1, of the teleoperated or conventional type. Preferably, the platform is configured to limit on board the movements due to the state of the sea, in particular due to the swell, and even more the accelerations linked to the state of the sea.

To protect the autonomous underwater craft 12 during the critical steps of deployment and recovery, in particular the launching/immersion from the platform and the raising on board/onto the platform, a recovery vehicle 11 is implemented, which comprises internally a housing allowing a storage of the autonomous underwater craft 12.

At least one of the faces of the recovery vehicle housing is provided with longitudinal holes or slots allowing the different lateral ailerons and appendices of the autonomous underwater craft to be inserted and to move/slide therein. These longitudinal holes may open or not and, potentially, only in part on the external lateral sides of the recovery vehicle. Those longitudinal holes may have a flared shape towards the rear, on the receiving end side, in order to facilitate the entry of the autonomous underwater craft into the recovery vehicle housing. Those longitudinal holes may further be used as means for indexing the axial rotation position of the autonomous underwater craft with respect to the recovery vehicle.

To favour the docking of the autonomous underwater craft in the recovery vehicle, the docking is made in immersion at a sufficient depth so that the wave movements are very reduced.

The recovery vehicle 11 that is towed from the front (contrary to the ROVs that are lowered and raised vertically) can be motorized and, in any case, it is capable of keeping a position under the water surface in all the degrees of freedom, for example thanks to active ailerons. The towing of the recovery vehicle 11 is made with a towing cable 13 that may further comprise a data link between the platform and the recovery vehicle 11 and/or a power link, in particular electrical, between both. The recovery vehicle 11 comprises a controlled removable automatic mooring system for locking the autonomous underwater craft 12 in the recovery vehicle 11.

The autonomous underwater craft 12 and the recovery vehicle 11 comprise a system for the automatic recovery of the vehicle 12 into the vehicle 11 ("homing system") with, in particular, sensors and other equipment allowing an automatic guidance of the autonomous underwater craft 12 so that it can be stored inside the housing of the recovery vehicle 11.

Preferably, the autonomous underwater craft 12 and the recovery vehicle 11 comprise a data transfer connection system between them, and possibly with the platform, and/or an electrical connection for electrical charging of the autonomous underwater craft 12 that comprises rechargeable batteries.

For the launching/immersion from the platform and the raising on board/onto the platform of the autonomous underwater craft 12 stored in the recovery vehicle 11, a launch ramp 10 able to be half-immersed is implemented. This launch ramp 10 is articulated by a swivel joint, or even a ball joint, with the platform and a system for raising and locking the launch ramp 10 in upper/raised position is implemented.

The exemplified ship 1 shown in the figures is of the catamaran type and comprises a shell formed of two parallel lateral hulls 2a, 2b, separated from each other by an intermediate link area 3 located above the waterline 9.

The two lateral parts of the shell forming the hulls 2a, 2b have a front shape of the wave-piercing type. The intermediate link area 3 is out of water, above the waterline 9, and is better seen in FIG. 3.

The upper part of the ship further comprises a deck 6, equipment 5 useful for the navigation, such as, for example, radar, radio antenna(s), transponder . . . Regulatory equipment is also provided such as regulatory lights/lighting.

The ship shell comprises externally, above the waterline, elastomeric bands 8a, 8b, intended to damp the lateral shocks against the shell.

The shell (or sides) of the ship 1 allows delimiting an inner volume in which can be stored a recovery vehicle 11 itself storing, in its own sides, an autonomous underwater craft 12 when they are not deployed/operational, i.e. not launched at sea.

The ship 1 is of the mechanical propulsion type, in this example by rear steerable propellers 4a, 4b, arranged at the bottom of the hulls. The ship 1 comprises other non-steerable, front propellers 7a, 7b, arranged through the hulls. The hulls 4a, 4b, 7a, 7b are motorized, preferably by electrical motors, and electrical power can be provided by rechargeable batteries and/or photovoltaic cells and/or a heat engine power generator and/or fuel cell.

The ship 1 has a typical length of 25 m and a typical width of 6 m. It can however have a length between 6 m and 150 m and a width between 0.8 m and 30 m according to the model.

As can be better seen in FIGS. 4 to 7, the intermediate link area 3 comprises, towards the rear of the ship 1, a launch ramp 10 for the recovery vehicle 11, said launch ramp 10 also serving for the recovery of the recovery vehicle 11. The recovery vehicle 11 is connected by a towing cable 13 to the ship 1. The towing cable 13 can be unwound for the launching or rewound for the recovery of the recovery vehicle 11 thanks to a motorized and controlled winding-unwinding device 14. The towing cable 13 is fastened towards the front of the recovery vehicle 11.

Figure 3:
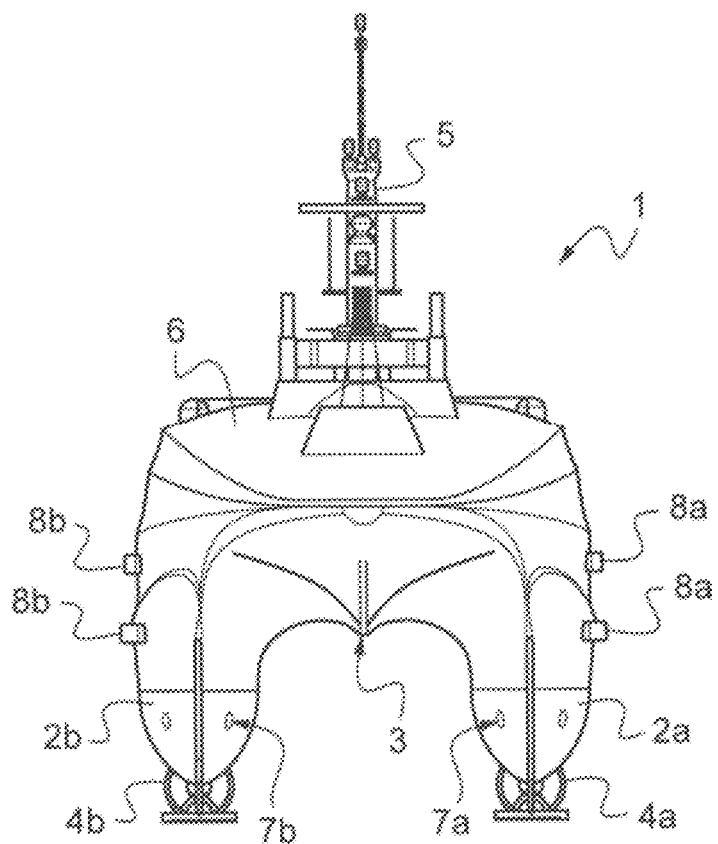
FIG. 3 shows a front view of the front, bow, of the ship of FIG. 1.
Figure 4:
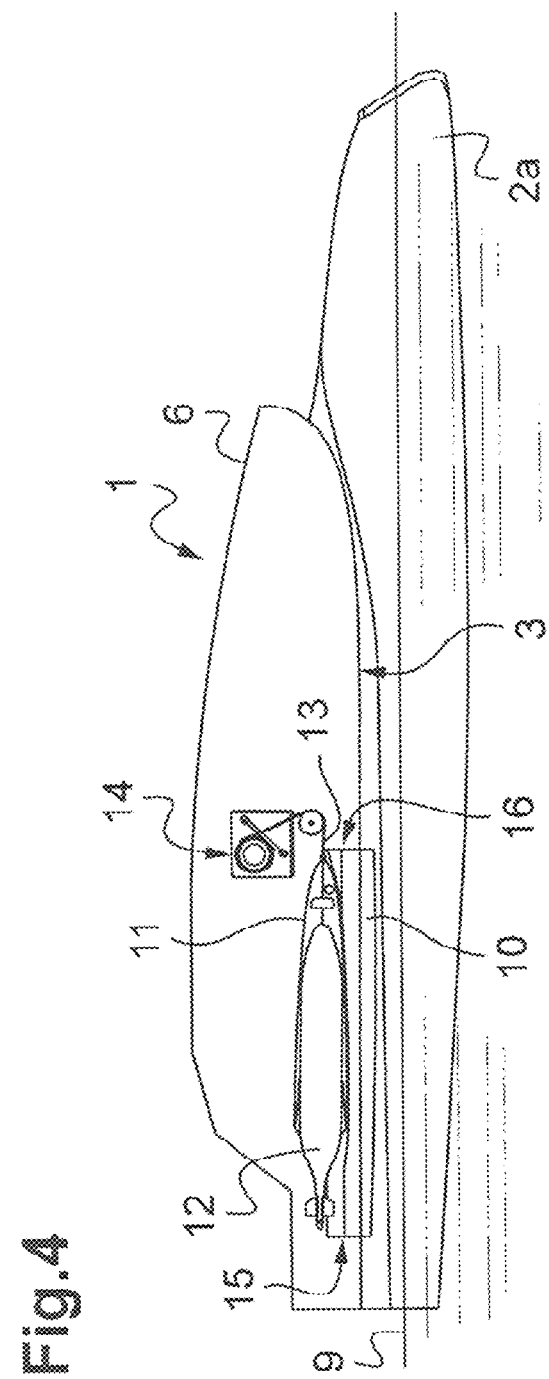
FIG. 4 shows a simplified sagittal sectional view of the ship of FIG. 1 whereas the autonomous underwater craft stored in the recovery vehicle is stored in the sides of said ship, the launch ramp on which is positioned the recovery vehicle being raised and closing the intermediate link area between the two parallel lateral hulls of the ship shell.
Figure 9:
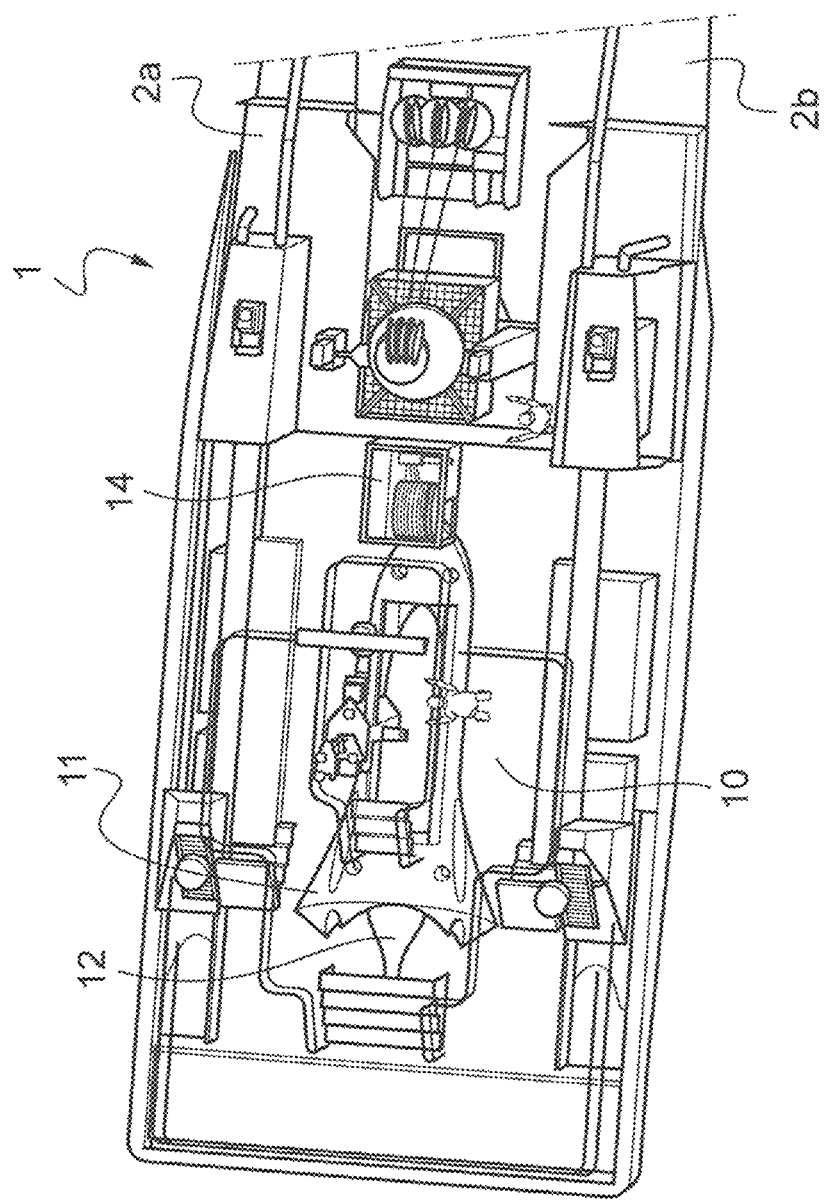
FIG. 9 shows a perspective view from the top of a ship according to the invention, in partial transparency, making it possible to see the inside of the ship sides, whereas the autonomous underwater craft stored in the recovery vehicle is stored in said sides, the launch ramp on which is positioned the recovery vehicle being raised.

In FIGS. 3, 4 and 9, the launch ramp 10 is in raised position and in the general continuity of the intermediate link area 3 and it tightly closes the shell of the ship 1 in this area.

The launch ramp 10 is articulated and can be tilted to be inclined as can be seen in FIGS. 5 to 8. The articulation of the launch ramp 10 is located towards the front 16 of the launch ramp 10, and the rear end 15 of the launch ramp 10 can thus be lowered and brought under water to be submersed, under the waterline 9 (FIG. 5), when the launch ramp is inclined.

The tilting/inclination can be ensured by a swivel joint, the axis of articulation being elongated transversally (perpendicular to the sagittal plane of the ship), along the width of the launch ramp that has therefore a possible angular displacement in a single plane, the sagittal plane. However, it is provided a tilting of more than one degree of freedom with possible angular displacements in two perpendicular planes, a sagittal one and, in addition, a transverse one. In this latter case, this can allow for pitch compensation and also roll/heel compensation, in particular when the launch ramp 10 is provided with a reserve buoyancy in order to be half-immersed when in lower position, with or without a load (including the recovery vehicle 11) in place. This compensation may avoid that the surface of the inclined launch ramp goes too far from the horizontal in the transverse direction, the ramp being inclined in the longitudinal direction. With this buoyancy of the rear end of the launch ramp 10, the compensation is passive but, as an alternative or as a supplement, an active compensation by effectors controlled as a function of measurements taken by pitch, or even also roll, sensors, is provided. A system for passive or active damping of the rotation motions about the swivel or ball joint or any other suitable joint type may be implemented.

Preferably, the launch ramp, thanks to its buoyancy means, can beat freely in the inclined position, as a function of the waves, a beat damping device being however implemented. In such conditions, the launch ramp thus passively adapts to the sea surface height with respect to the ship. Stops may be provided to limit the beat stroke in the inclined position of the launch ramp.

It may also be provided, on the lower face of the launch ramp 10, a shape and/or a structure and/or a material that damps the wave impact on the inclined launch ramp.

The material may be a porous double-skin absorbing the wave impact.

The recovery vehicle 11 may be passive from the point of view of its underwater movements, these latter being due only to the towing, or controlled active propulsion means may be provided for the recovery vehicle 11. Preferably, the recovery vehicle 11 comprises controlled guiding means, typically ailerons, riders . . . or steerable thrusters. The towing cable 13 may be a simple line or, preferably, comprise electrical and/or data links to control and command of the recovery vehicle 11, and potentially power supply and data exchange with the recovery vehicle 11 and the autonomous underwater craft 12 when the latter is stored in the vehicle 11.

It is to be noted that the active recovery vehicle 11 with controlled active propulsion means, controlled guiding means, can operate in active or in passive mode, according to the case. It is also provided that the recovery vehicle 11 is mixed, with ailerons for certain degrees of freedom and a thruster for other ones.

The autonomous underwater craft 12 comprises in particular propulsion, guiding and measurement equipment. The propulsion is performed by the rear, thanks to a propeller in this example. It may be noted that said propeller protrudes from the rear of the recovery vehicle 11 when the autonomous underwater craft 12 is stored in the recovery vehicle 11 whereas the front and most part of the autonomous underwater craft 12 is well protected, in a housing inside the recovery vehicle 11.

When the autonomous underwater craft 12 is stored in the recovery vehicle 11, internal controlled removable mooring means are provided between the autonomous underwater craft 12 and the recovery vehicle 11, in order to maintain the craft 12 in the vehicle 11. Moreover, in certain embodiments, electrical and/or data and/or fluid connections are provided between the autonomous underwater craft 12 and the recovery vehicle 11, in case of mooring, for example, for recharging batteries of the autonomous underwater craft 12.

The autonomous underwater craft 12 and the recovery vehicle 11 comprise an automatic docking system in such a way that, on the one hand, the autonomous underwater craft 12 is automatically positioned in the axis of the recovery vehicle 11, on the rear of the latter, facing the receiving end 17 of said recovery vehicle 11, and on the other hand, enter thereinto to be received in the housing of said recovery vehicle 11 and be moored thereto.

The recovery vehicle 11 is profiled, of adapted hydrodynamic shape, in order to offer a low resistance to the advancement submerged/in water and high towing speeds up to 8 knots.

The autonomous underwater craft 12 is also profiled, of adapted hydrodynamic shape, a torpedo shape, in order to offer a low resistance to the advancement submerged/in water and high speeds of autonomous displacement up to 10 knots.

It is to be noted that the automatic recovery of the autonomous underwater craft 12 in the recovery vehicle 11 can be made whereas the latter is towed, and that up to a speed of 5 knots.

Figure 5:
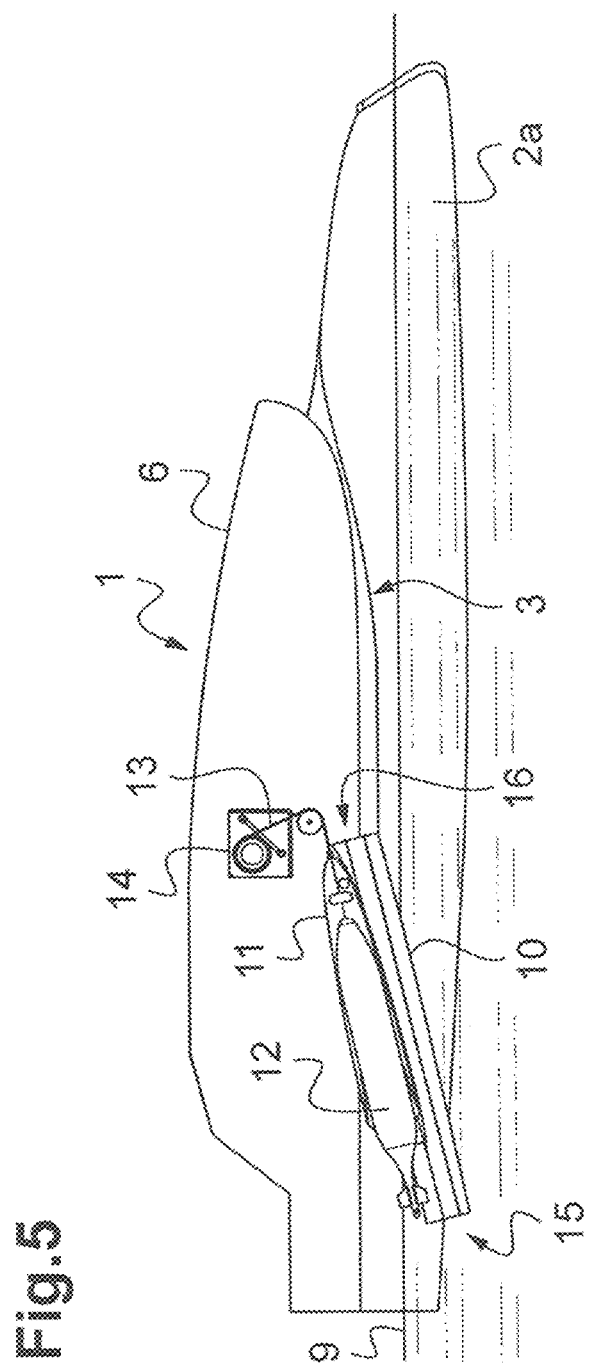
FIG. 5 shows a simplified sagittal sectional view of the ship of FIG. 1 whereas the recovery vehicle storing the autonomous underwater craft is being deployed (or recovered), the launch ramp on which is positioned the recovery vehicle having been inclined/tilted so that the rear end of the launch ramp is immersed.
Figure 6:
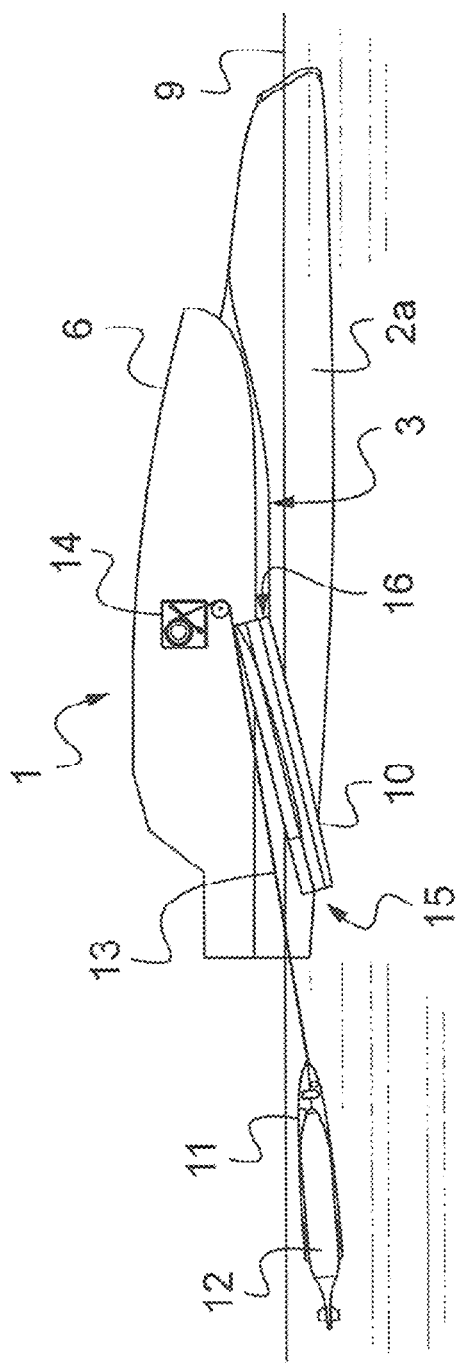
FIG. 6 shows a simplified sagittal sectional view of the ship of FIG. 1 whereas the recovery vehicle storing the autonomous underwater craft is being deployed (or recovered), the recovery vehicle storing the autonomous underwater craft having been released from the launch ramp and moving away from (or being brought back towards) the ship, the recovery vehicle being connected by a cable to the ship.
Figure 7:
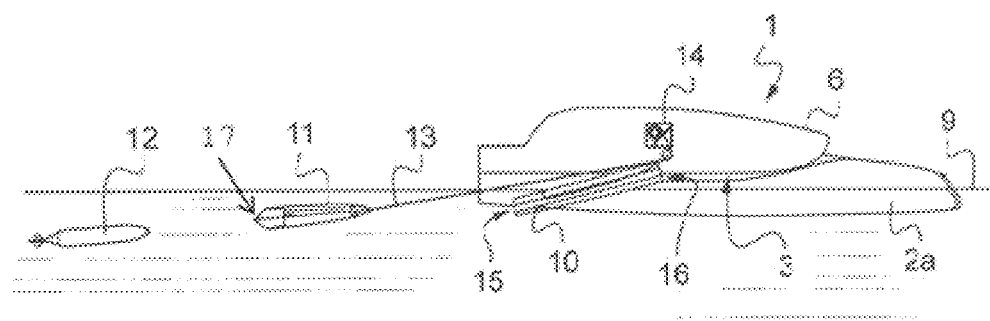
FIG. 7 shows a simplified sagittal sectional view of the ship of FIG. 1 whereas the autonomous underwater craft is out of the recovery vehicle towed by the ship.

FIGS. 4 to 7 show the deployment operations from FIGS. 4 to 7, or by equivalence and conversely, the recovery operations from FIGS. 7 to 4. In FIG. 4, the autonomous underwater craft 12 is stored in the recovery vehicle 11, the latter being stored on the raised launch ramp 10, closing the intermediate link area 3 of the ship 1. In this configuration, in which the autonomous underwater craft 12 and the recovery vehicle 11 are stored in the sides of the ship 1, these elements can be moved quickly and in an environmentally protected manner, between exploration areas or towards a mooring in a port. As a function of the size of the ship 1, it can even be planned to bring the ship 1 back onto the deck of a greater vessel.

In the case of a ship of adapted size, it is provided that the autonomous underwater craft 12 and/or the recovery vehicle 11 stored in the sides of the ship 1 can be serviced by personnel mounted on board the ship 1, as shown in FIG. 9.

FIG. 5, the launch ramp 10 is inclined by tilting in such a way that its rear end 15 is submerged and that the rear of the autonomous underwater craft 12 stored in the recovery vehicle 11 is also, preferably, submerged/in water.

In this configuration, the recovery vehicle 11 and the autonomous underwater craft 12 stored therein are inclined toward the rear and the bottom and tend to move down along the launch ramp 10, the towing cable 13 making it possible to control the lowering for launching/immersion (or, conversely, the raising during the recovery). The raising of the rear end 15 of the launch ramp 10 is motorized. The tilting of the launch ramp 10 for lowering its rear end 15 is preferably motorized. For example, a system of cables or chains connected to the rear end 15 of the launch ramp 10 or towards this rear end allows controlling the lowering and the raising. An electric motor of the winch or jack type can be used.

The rear end 15 of the launch ramp 10 preferably has a certain buoyancy, which allows it to follow the water level.

The launch ramp 10 may comprise rolls and/or rollers and/or bearings and/or slides and/or sliding bands facilitating the lowering and the raising of the recovery vehicle 11. A guiding system may be provided between the recovery vehicle 11 and the launch ramp 10, for example a longitudinal slot at the surface of the launch ramp 10, inside which an aileron of the recovery vehicle 11 can circulate. A towing cable guide 13 may also be provided, making sure that the cable 13 remains substantially along the launch ramp 10 during the deployment or the recovery of the recovery vehicle 11.

Thus, the launch ramp 10 can be provided, on its upper face, with a cable guide on a slide so that the cable guide is close to the upper surface of the launch ramp 10 at the rear end of the launch ramp 10 when the recovery vehicle 11 is in the sea and is caused to go back in the ship 1.

Figure 8:
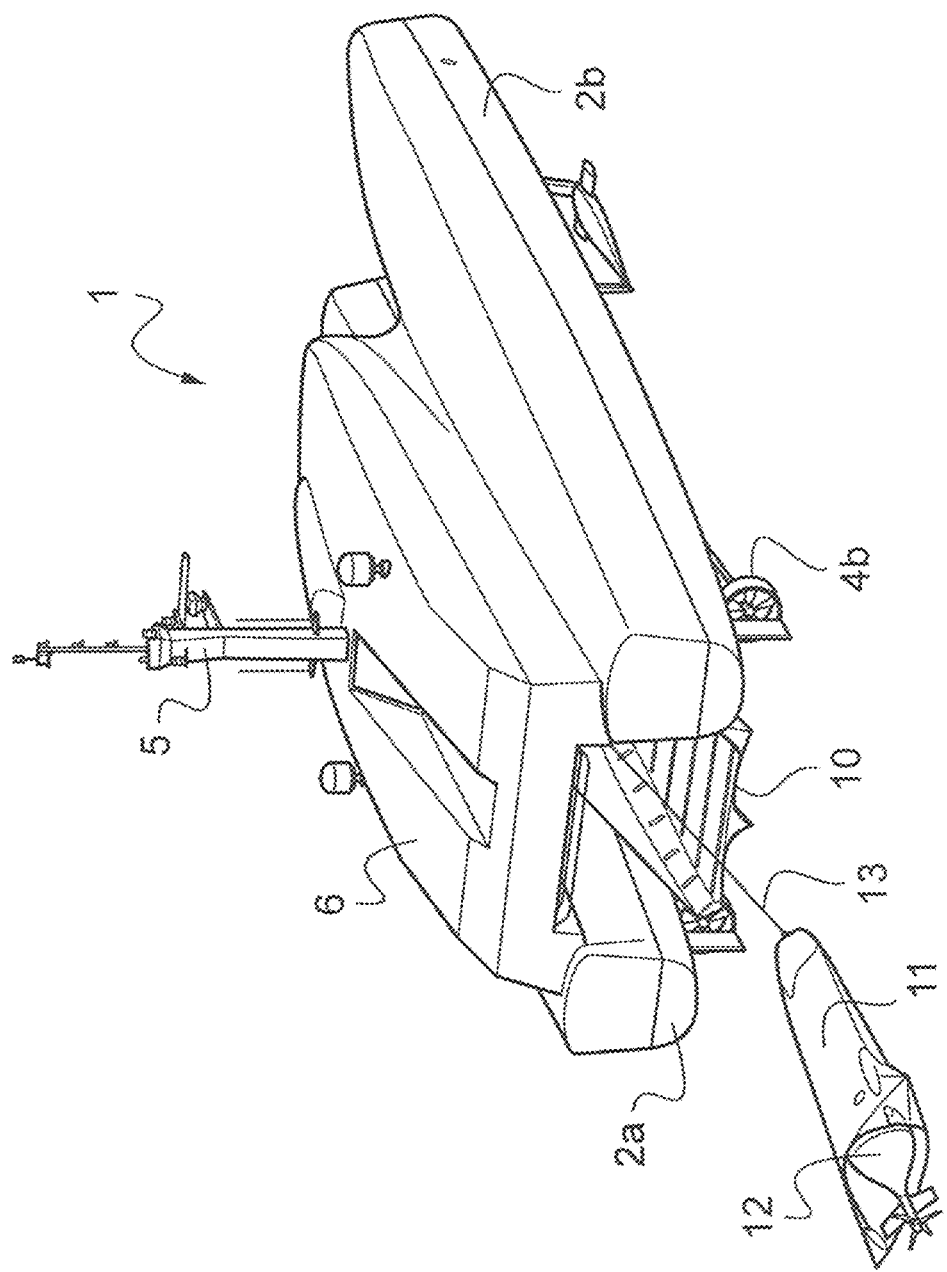
FIG. 8 shows a perspective view from the rear, stern, of a ship according to the invention, in a state of deployment (or recovery) corresponding to that of FIG. 6.

In FIG. 6, the recovery vehicle 11 has moved away from the ship 1 that sails forward, the towing cable 13 being unwound and the recovery vehicle 11 being towed by the ship 1. The autonomous underwater craft 12 is also stored in the recovery vehicle 11. The perspective view of FIG. 8 shows a similar configuration.

In FIG. 7, after opening of the internal controlled removable mooring means arranged between the autonomous underwater craft 12 and the recovery vehicle 11, the autonomous underwater craft 12 is released and out of the housing of the recovery vehicle 11 and begins to move autonomously.

Preferably, the release of the autonomous underwater craft 12 is made at a depth of at least forty meters or, at least, at a depth at which the water surface movements, in particular the swell, have no effect. Such a depth is preferably also chosen for the automatic recovery of the autonomous underwater craft 12 within the housing of the recovery vehicle 11.

Figure 10:
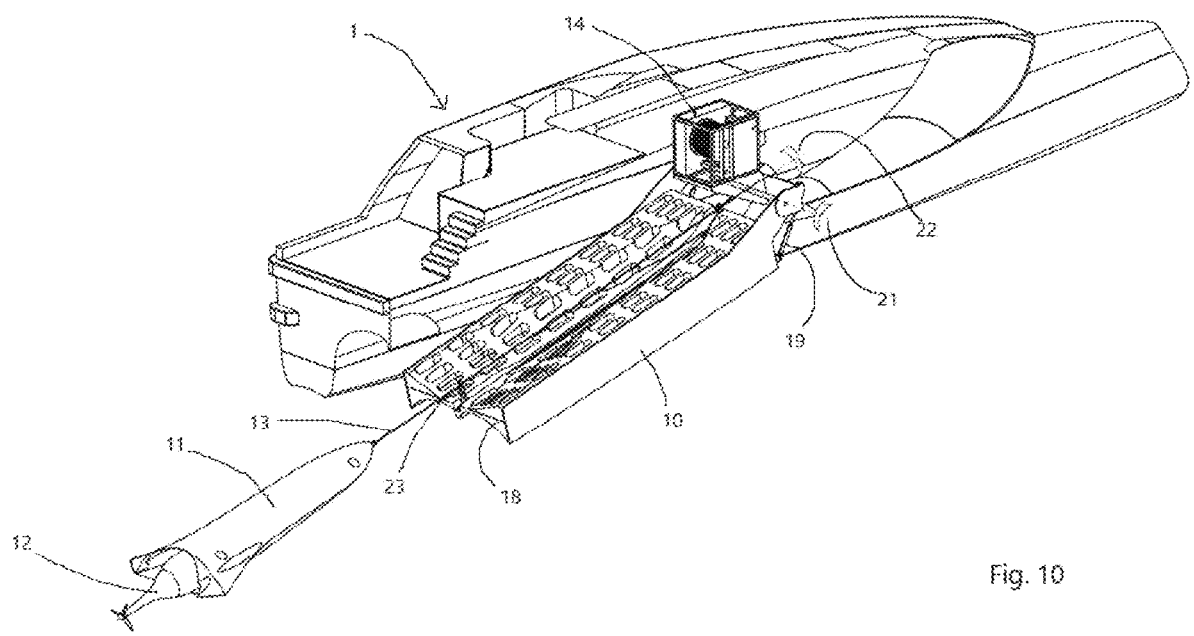
FIGS. 10, 11, 12 show:
buoyancy means 18 of the launch ramp;
beat dampers 19 in the form of dampers that are visible on those figures;
a towing cable guiding device 23;
a translational device 20 that allows the translation of the towing cable guiding device 23 and therefore facilitates the lowering and the raising of the recovery vehicle along the ramp; and
articulations according to two axes 21, 22 of rotation perpendicular to each other.
Figure 11:
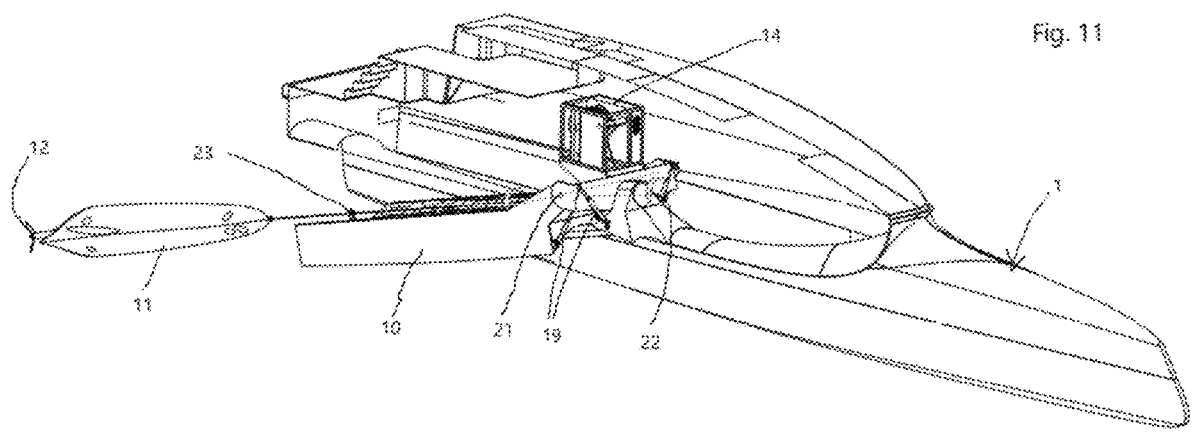
Figure 12:
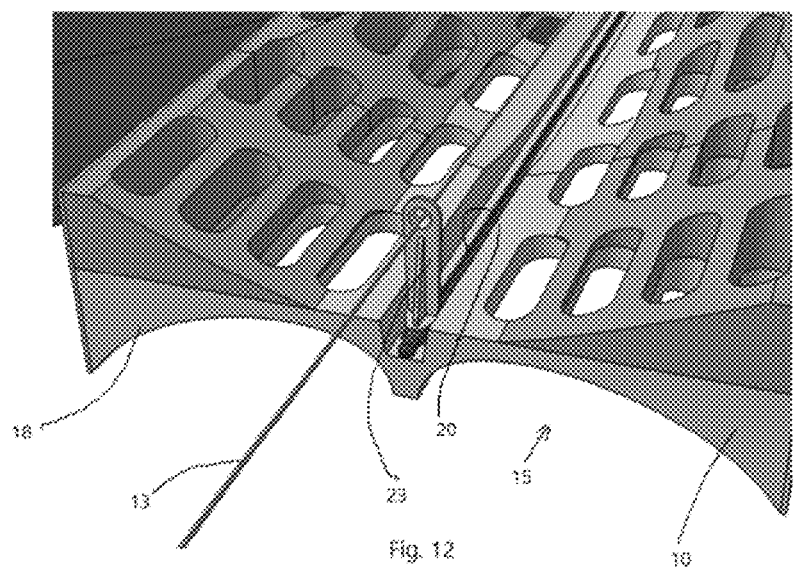

On the FIGS. 10, 11, 12 the following characteristics are referenced:
buoyancy means 18 of the launch ramp.
beat dampers 19 in the form of dampers that are visible on those figures. On the lower face of the launch ramp 10 this is a porous double-skin absorbing the wave impact.
a towing cable guiding device 23.
a translational device 20 that allows the translation of the towing cable guiding device 23 and therefore facilitates the lowering and the raising of the recovery vehicle along the ramp.
articulations according to two axes 21, 22 of rotation perpendicular to each other.

It is understood that the invention can be declined in many other ways. For example, the ship may be single-hull and the tilting launch ramp may form the rear part of the shell and of the deck. For example, the recovery vehicle 11 may comprise several housings open rearward, for storing several autonomous underwater crafts 12 or a single large housing for storing several autonomous underwater crafts 12 in series. For example, the ship may comprise several tilting launch ramps for as many recovery vehicles 11.

The invention claimed is:

1. A system for deploying and recovering an autonomous underwater craft by a recovery vehicle towed by a surface ship, the system including the ship and the recovery vehicle, the towing being ensured by a towing cable connecting the recovery vehicle to the ship, the system being configured so that when not in use the underwater craft is stored in a housing of the recovery vehicle and the recovery vehicle is stored out of water in the ship, the recovery vehicle having, along the recovery vehicle's length, two opposite ends, including an end for receiving the autonomous underwater craft, providing access to the housing, the system being configured to allow the deployment to be performed in two stages, a first stage of submersing the recovery vehicle with the underwater craft stored in said recovery vehicle, a second stage of releasing the underwater craft by bringing the underwater craft out of the housing of the submersed recovery vehicle once the towed recovery vehicle at a determined distance away from the ship, the system being configured to allow the recovery to be made in two phases, a first phase of entry of the underwater craft, through the receiving end, into the housing of the submersed towed recovery vehicle, a second phase of loading the towed recovery vehicle on board the ship, with the underwater craft stored in said recovery vehicle, the ship comprising a launch ramp, which is tilting, and the system being configured to store the recovery vehicle on the launch ramp, the launch ramp having a longitudinal extent and two longitudinal ends, a front end on the ship bow side and a rear end on the ship stern side, said tilting launch ramp being able to take at least two positions: a raised position in which the stored recovery vehicle is out of water, said raised launch ramp being above the waterline of the ship, and an inclined position in which the rear end of the launch ramp is immersed, the system including a translational device enabling the recovery vehicle, in the inclined position of the launch ramp, to move along the launch ramp to be submersed and be able to move away from the ship while being towed by the ship latter during the deployment and to be raised along the launch ramp during the recovery, and wherein the rear end of the launch ramp comprises buoyancy means allowing said launch ramp in the inclined position to beat as a function of the water height at the buoyancy means,
- wherein the front end of the launch ramp comprises an articulation according to two axes of rotation perpendicular to each other, with a first axis of rotation perpendicular to the sagittal plane of the ship and a second, longitudinal axis of rotation, in the sagittal plane,
- wherein the ship is a catamaran whose shell has two parallel lateral hulls, separated by an intermediate link area located above the waterline, and wherein the system is further configured so that, in the raised position, the launch ramp is out of water and forms part of the intermediate link area,
- wherein the launch ramp comprises at least one beat damper intended to damp the beats due to the wave impact on the inclined launch ramp, a lower face of the launch ramp having a material that damps the wave impact on the inclined launch ramp, said material being a porous double-skin absorbing the wave impact, and
- wherein the articulation comprises a damping system of the rotation motions about the axes of rotation of the articulation.

2. The system according to claim 1, further configured so that, in inclined position of the launch ramp, the recovery vehicle stored on the launch ramp has the recovery vehicle's receiving end submerged.

3. The system according to claim 2, wherein the lower face of the launch ramp has a relief capable of damping the shocks caused by the wave impact on the inclined launch ramp.

4. The system according to claim 3, wherein the ship comprises a winder/unwinder for the towing cable and the launch ramp comprises a towing cable guiding device enabling said towing cable to be maintained free to slide along the launch ramp.

5. The system according to claim 4, wherein the system is configured to allow the recovery, into the ship, of the underwater craft stored in the recovery vehicle whereas the ship sails at a speed of at least one knot.

6. The system according to claim 3, wherein the system is configured to allow the recovery, into the ship, of the underwater craft stored in the recovery vehicle whereas the ship sails at a speed of at least one knot.

7. The system according to claim 2, wherein the ship comprises a winder/unwinder for the towing cable and the launch ramp comprises a towing cable guiding device enabling said towing cable to be maintained free to slide along the launch ramp.

8. The system according to claim 2, wherein the system is configured to allow the recovery, into the ship, of the underwater craft stored in the recovery vehicle whereas the ship sails at a speed of at least one knot.

9. The system according to claim 1, wherein the system is configured to allow the recovery, into the ship, of the underwater craft stored in the recovery vehicle whereas the ship sails at a speed of at least one knot.

10. The system according to claim 1, wherein the lower face of the launch ramp has a relief capable of damping the shocks caused by the wave impact on the inclined launch ramp.

11. The system according to claim 1, wherein the ship comprises a winder/unwinder for the towing cable and the launch ramp comprises a towing cable guiding device enabling said towing cable to be maintained free to slide along the launch ramp.

12. An underwater exploration unit including the system of claim 1, and an autonomous underwater craft.

13. A method for implementing the unit according to claim 12, wherein, with a ship storing on a tilting launch ramp an autonomous underwater craft stored in a housing of a recovery vehicle, during a deployment of the autonomous underwater craft, the launch ramp is tilted in order to be brought to an inclined position in which the rear end of the launch ramp is immersed, the recovery vehicle that is towed by the ship thanks to a towing cable is immersed, the towing cable is unwound in such a way that the recovery vehicle storing the autonomous underwater craft goes away from the ship, then at a determined distance from the ship, the autonomous underwater craft is released out of the recovery vehicle,
- wherein a ship is implemented, which is a catamaran whose shell has two parallel lateral hulls, separated by an intermediate link area located above the waterline, in such a way that, in the raised position, the launch ramp is out of water and forms part of the intermediate link area, and
- wherein a launch ramp is implemented, which front end comprises an articulation according to two axes of rotation perpendicular to each other, with a first axis of rotation perpendicular to the sagittal plane of the ship and a second, longitudinal axis of rotation, in the sagittal plane, the articulation comprising a damping system of the rotation motions about the axes of rotation of the articulation, and which comprises at least one beat damper intended to damp the beats due to the wave impact on the inclined launch ramp and being a material that damps the wave impact on the inclined launch ramp, a lower face of the launch ramp having said material, said material being a porous double-skin absorbing the wave impact.

\* \* \* \* \*